US012226675B2

(12) United States Patent
Watanabe et al.

(10) Patent No.: US 12,226,675 B2
(45) Date of Patent: Feb. 18, 2025

(54) GOLF BALL

(71) Applicant: BRIDGESTONE SPORTS CO., LTD., Tokyo (JP)

(72) Inventors: Hideo Watanabe, Saitamaken (JP); Atsushi Komatsu, Saitamaken (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 80 days.

(21) Appl. No.: 18/168,886

(22) Filed: Feb. 14, 2023

(65) Prior Publication Data
US 2023/0264076 A1    Aug. 24, 2023

(30) Foreign Application Priority Data

Feb. 22, 2022 (JP) .................. 2022-025662

(51) Int. Cl.
    *A63B 37/06*        (2006.01)
    *A63B 37/00*        (2006.01)
    *C08K 9/02*         (2006.01)

(52) U.S. Cl.
    CPC .. *A63B 37/00223* (2020.08); *A63B 37/00221* (2020.08); *C08K 9/02* (2013.01)

(58) Field of Classification Search
    CPC ........ A63B 37/00223; A63B 37/00376; A63B 37/00495
See application file for complete search history.

(56) References Cited

U.S. PATENT DOCUMENTS

| | | | | |
|---|---|---|---|---|
| 5,823,890 | A * | 10/1998 | Maruko | A63B 37/0033 473/378 |
| 6,558,277 | B1 * | 5/2003 | Ohira | A63B 37/0003 473/378 |
| 8,469,837 | B2 * | 6/2013 | Komatsu | A63B 37/00223 473/378 |
| 2004/0097302 | A1 | 5/2004 | Isogawa et al. | |
| 2007/0015603 | A1 * | 1/2007 | Watanabe | A63B 43/008 473/371 |
| 2007/0149323 | A1 * | 6/2007 | Morgan | A63B 37/0006 473/378 |
| 2008/0182683 | A1 | 7/2008 | Hirau et al. | |

(Continued)

FOREIGN PATENT DOCUMENTS

| | | |
|---|---|---|
| JP | 06-170013 A | 6/1994 |
| JP | 2000-254251 A | 9/2000 |

(Continued)

*Primary Examiner* — Raeann Gorden
(74) *Attorney, Agent, or Firm* — Sughrue Mion, PLLC

(57) ABSTRACT

In a golf ball having a core, a cover, at least one intermediate layer therebetween, and a coating layer on the cover, the cover is formed of a transparent or translucent resin composition and the intermediate layer is formed of a resin composition. The sphere consisting of the core encased by the intermediate layer has specific lightness and chroma values in the Lab color space. The coating layer is composed of one or more layer, at least one of which contains an effect pigment having polarizing properties. Markings are provided inside of the coating layer and have a specific L value. During use, the ball retains a visual to familiarity close to that of a white ball. Up close, it is clearly discernible from a white ball; from a distance, it appears white and is highly visible.

6 Claims, 3 Drawing Sheets

(56) References Cited

U.S. PATENT DOCUMENTS

| | | | |
|---|---|---|---|
| 2009/0054175 A1 | 2/2009 | Isogawa et al. | |
| 2009/0054176 A1 | 2/2009 | Isogawa et al. | |
| 2009/0111614 A1 | 4/2009 | Ohira | |
| 2010/0227710 A1 | 9/2010 | Morgan et al. | |
| 2010/0255938 A1* | 10/2010 | Komatsu | A63B 37/0021 473/378 |

FOREIGN PATENT DOCUMENTS

| | | |
|---|---|---|
| JP | 2001-087423 A | 4/2001 |
| JP | 2004-166719 A | 6/2004 |
| JP | 2008-161375 A | 7/2008 |
| JP | 2008-183148 A | 8/2008 |
| JP | 2009-45234 A | 3/2009 |
| JP | 2009-45347 A | 3/2009 |
| JP | 2009-106720 A | 5/2009 |

* cited by examiner

GOLF BALL

CROSS-REFERENCE TO RELATED APPLICATION

This non-provisional application claims priority under 35 U.S.C. § 119(a) on Patent Application No. 2022-025662 filed in Japan on Feb. 22, 2022, the entire contents of which are hereby incorporated by reference.

TECHNICAL FIELD

The present invention relates to a white golf ball having a core, a cover, at least one intermediate layer formed between the core and the cover, and a coating layer formed on an outside surface of the cover.

BACKGROUND ART

The great majority of golf balls sold on the market are white. Golf balls that are white are easy to see when the ball is at rest, and the trajectory of the ball after being hit is easy to follow. In general, most golfers use white balls, but merely adding creative touches to the design and colors of the markings on a white ball is not, in and of itself, enough to give the ball appearance a quality feel.

A number of disclosures in the art relate to golf balls having an appearance with a quality feel, which balls contain an effect pigment in the base resin of the cover or of a coating layer. For example, in JP-A 2008-161375, an effect pigment having a core layer coated with metal is included in the main body of the golf ball or in a coating layer on the ball. However, in this golf ball, the degree of whiteness of the intermediate layer is unclear and, when a coating layer is formed on the surface of the markings, those markings when viewed lack a quality feel.

In addition, JP-A H6-170013, JP-A 2000-254251, JP-A 2008-183148, JP-A 2009-45234, JP-A 2009-45347 and JP-A 2009-106720 describe golf balls which contain a polarizing pigment in a coating layer. However, these fall short of being golf balls having a white base color in which the markings in particular are clearly discernible and the overall ball exhibits a quality feel.

Other art relating to the white golf ball of the present invention includes JP-A 2001-87423 and U.S. Patent Application Publication No. 2010/0227710, in which a glossy additive is included in the cover material. In addition, U.S. Patent Application Publication No. 2007/0149323 describes a golf ball in which the intermediate layer is colored, the cover exhibits transparency, and optically active particles having a high reflectance are included in the intermediate layer or the cover. Also, JP-A 2004-166719 describes a golf ball in which a transparent coat contains a distinctive effect pigment and covers markings having a color tone with a low L value (lightness) in the Lab color space. However, these golf balls too cannot be regarded as golf balls which exhibit an elegant white color and whose markings exhibit, in combination with the coating layer, a distinctive sense of quality.

SUMMARY OF THE INVENTION

It is therefore an object of the present invention to provide a golf ball which during use retains a visual familiarity close to that of a white ball and which, moreover, is clearly discernible up close from a white ball and, from a distance, appears white and is highly visible.

As a result of intensive investigations, we have found that by producing a golf ball with a core, a cover and an intermediate layer therebetween such that the intermediate layer is formed of a white resin composition and the cover has transparency, the whiteness of the ball appearance is manifested by the surface color of the intermediate layer. In addition, we have discovered that by forming a coating layer on the outside surface of the cover and including an effect pigment in this coating layer and by also forming markings of a relatively small lightness value to the inside of the coating layer, the overall ball exhibits a quality feel, and also that the markings, owing to their color intensity in combination with the coating layer, appear as dazzling and elegant indicia. In particular, when the effect pigment included in the coating layer has polarizing properties, the color tone varies with the angle at which the ball is viewed, increasing the sense of elegance.

Accordingly, the invention provides a golf ball having a core, a cover, at least one intermediate layer formed between the core and the cover, and a coating layer formed on an outer surface of the cover, wherein the cover is formed of a transparent or translucent resin composition; the intermediate layer is formed of a resin composition, the sphere obtained by encasing the core with the intermediate layer (intermediate layer-encased sphere) has an L value (lightness) of 92 or more and a chroma value C of 10 or less in the Lab color space based on JIS Z 8722; the coating layer is a single layer or a plurality of layers, at least one of which contains an effect pigment having polarizing properties; and markings are provided inside of the coating layer, the markings having an L value as measured prior to application of the coating layer of 60 or less.

In a preferred embodiment of the golf ball of the invention, the intermediate layer includes a white pigment. The white pigment is preferably titanium oxide. In this preferred embodiment, the L value (lightness) of the intermediate layer-encased sphere is 94 or more and the chroma is 5 or less.

In another preferred embodiment of the inventive golf ball, the ball with the coating layer thereon and the intermediate layer-encased sphere have a color difference ΔE therebetween which is 10 or less.

In yet another preferred embodiment, the effect pigment is a material made of composite particles which have a core of mica and a coat covering the core.

In still another preferred embodiment, the effect pigment is included in an amount of from 3 to 23 parts by weight per 100 parts by weight of a base resin in the coating layer.

Advantageous Effects of the Invention

The golf ball of the invention is a white ball having a quality feel. Up close, the ball is easily discernible from a conventional white ball; from a distance, it appears white and is highly visible. In particular, the markings on the ball serve as dazzling and elegant indicia.

BRIEF DESCRIPTION OF THE DIAGRAMS

DESCRIPTION OF THE PREFERRED EMBODIMENTS

The objects, features and advantages of the invention will become more apparent from the following detailed description taken in conjunction with the appended diagrams.

Figure 1:
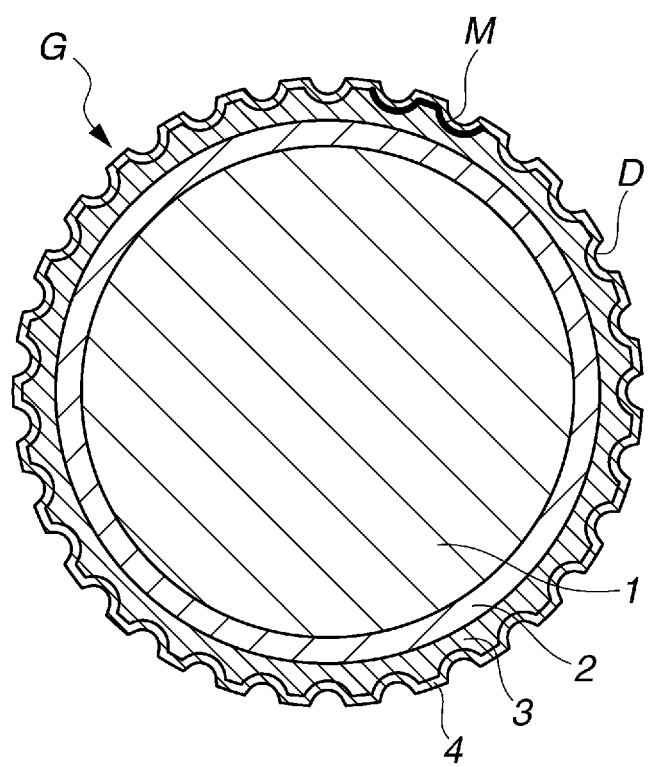
FIG. 1 is a schematic cross-sectional view of a golf ball according to one embodiment of the invention.

The golf ball of the invention has a core, a cover, an intermediate layer formed between the core and the cover, and a coating layer formed on an outer surface of the cover. For example, the golf ball G shown in FIG. 1 has a three-layer construction that includes a core 1, an intermediate layer 2 encasing the core 1, and a cover 3 encasing the intermediate layer 2. The intermediate layer 2 is formed as a single layer in this example, although it may also be formed as a plurality of layers. The cover 3 is positioned as the outermost layer, aside from a coating layer, in the layered construction of the ball. Numerous dimples D are typically formed on the surface of the cover (outermost layer) 3 in order to enhance the aerodynamic properties of the ball. A coating layer 4 is formed on the surface of the cover 3, and markings M are provided on the inside of the coating layer 4. The coating layer 4 is formed as a single layer in this example, although it may also be formed as a plurality of layers. The layers in the golf ball construction are each described below in detail.

The core may be formed of a known rubber material as the base material. A known base rubber that is a natural rubber or a synthetic rubber may be used for this purpose. More specifically, the use of primarily polybutadiene, especially cis-1,4-polybutadiene having a cis structure content of 40% or more, is recommended. In the base rubber, where desired, a natural rubber, polyisoprene rubber, styrene-butadiene rubber or the like may be used together with the above polybutadiene. The polybutadiene may be synthesized with a titanium-, cobalt-, nickel- or neodymium-based Ziegler catalyst or with a metal catalyst such as cobalt or nickel.

Other ingredients, including co-crosslinking agents such as unsaturated carboxylic acids and metal salts thereof, inorganic fillers such as zinc oxide, barium sulfate and calcium carbonate, and organic peroxides such as dicumyl peroxide and 1,1-bis(t-butylperoxy)cyclohexane may be compounded with the above base rubber. Where necessary, commercial antioxidants and the like may also be suitably added.

At least one intermediate layer and a cover are formed over the core as golf ball components that encase the core. When the intermediate layer is composed of two layers, the respective layers are sometimes referred to as, starting from the inside: the envelope layer, the intermediate layer, and the outermost layer. The intermediate layer may even be composed of three or more layers, in which case the respective layers are sometimes referred to as, starting from the inside: the inner envelope layer, the outer envelope layer, the intermediate layer, and the outermost layer.

The intermediate layer is formed of a resin composition. This resin composition is exemplified by resin compositions made up primarily of a resin that has hitherto been used as a golf ball material. The resin is exemplified by ionomer resins, polyester resins, polyurethane resins, polyamide resins, polyolefin resins, olefin-based thermoplastic elastomers and styrene-based thermoplastic elastomers. In particular, from the standpoint of resilience and moldability, an ionomer resin is preferred.

It is desirable to include a white pigment in the resin composition. Examples of white pigments include titanium oxide, zinc oxide, barium sulfate, zinc sulfide and white mica. By using these white pigments, golf balls with an appearance having a striking degree of whiteness can be achieved.

The intermediate layer has a thickness which is preferably 0.8 mm or more, more preferably 1.0 mm or more, and even more preferably 1.2 mm or more. The upper limit is preferably 3.0 mm or less, more preferably 2.0 mm or less, and even more preferably 1.5 mm or less.

The sphere obtained by encasing the core with the intermediate layer (intermediate layer-encased sphere) has an L value (lightness) which is 92 or more, preferably 94 or more, and even more preferably 96 or more. When this value is too small, the L value of the ball as a whole becomes small, making the ball appear darker and lowering the ball discernibility and quality feel.

The intermediate layer-encased sphere has a C value (chroma) which is 10 or less, preferably 7 or less, and more preferably 5 or less. When this value is too large, the hue of the ball as a whole becomes perceivable to the human eye and so the ball is recognized as one that is not white, which may feel odd to golfers accustomed to using white balls.

The above L and C values refer to, respectively, the L value and the C value in the Lab color space, based on JIS Z 8722. The L value, or lightness, indicates the degree of color lightness and contains no information on the color tone. A lightness (L value) that is high signifies a bright color; one that is low signifies a dark or subdued color. The C value, or chroma, represents the vividness or lack of adulteration of a color and can be expressed as $C=(a^2+b^2)$. A known color difference meter, such as model MSC-IS-2DH from Suga Test Instruments Co., Ltd., may be used to measure these numerical values. Every time "L value" and "C value" are mentioned in this Specification, they have the above meanings.

The cover is formed of a resin composition. The resin composition is not particularly limited, although the cover may be formed using an ionomer resin, a polyurethane thermoplastic elastomer, a thermoset polyurethane or a mixture of any of these as the main ingredient of the resin composition. Moreover, in addition to the above main ingredient, other thermoplastic elastomers, polyisocyanate compounds, fatty acids or derivatives thereof, basic inorganic metal compounds, fillers and the like may be added to the cover.

The resin composition of the cover has transparency or translucency. Specifically, the cover has a visible light transmittance of 60% or more, preferably 70% or more, and more preferably 80% or more. The visible light transmittance can be measured based on JIS K 0115 using an instrument such as a commercial spectrophotometer. Measurement of the visible light transmittance of the cover may be carried out by measuring the visible light transmittance of a molded or otherwise formed sheet of the cover material as the sample or by peeling the cover from a finished golf ball, cutting the peeled cover into a strip that accords with the shape in which the sample to be measured is set in the instrument, setting the sample strip in the instrument and measuring the visible light transmittance.

The resin composition of the cover preferably contains no colorants. As used herein, a "colorant" refers to an additive which actively imparts color to the cover. What this means is that, in the present invention, as mentioned above, because the intermediate layer is formed of a resin composition that exhibits a white color, the degree of whiteness of the intermediate layer corresponding to the inner side of the cover manifests itself directly as the whiteness of the overall ball appearance. In cases where the cover is colored and has lost its transparency, the quality feel of the ball may not be achievable.

The cover has a thickness of preferably 0.3 mm or more, more preferably 0.6 mm or more, and even more preferably 0.8 mm or more. The upper limit is preferably 2.0 mm or less, more preferably 1.7 mm or less, and more preferably 1.5 mm or less. When the cover thickness is too small, the appearance approaches that of an ordinary white cover, and the discernibility (difference) with a ball having a white cover becomes small.

The resin composition can be obtained by using any of various types of mixers, such as a kneading-type single-screw or twin-screw extruder, a Banbury mixer or a kneader, to mix the above ingredients.

Numerous dimples of one or more type may be formed on the surface of the cover. The shapes, diameters, depths, number, surface coverage and other features of the dimples may be suitably selected.

The method for producing the golf ball prior to application of the subsequently described coating layer is not particularly limited, and may involve the use of a known molding method such as injection molding or compression molding. For example, a cover-encased (unpainted) golf ball can be produced by setting a golf ball core in the mold of an injection molding machine, feeding the intermediate layer-forming resin composition described above to the mold so as to produce a sphere composed of the core encased by an intermediate layer (intermediate layer-encased sphere), and subsequently setting the intermediate layer-encased sphere in another injection molding machine mold and injecting the cover-forming resin composition over the sphere.

The coating layer is formed using a coating composition. The base resin of this coating composition is not particularly limited; examples include polyurethane resins, epoxy resins, polyester resins, acrylic resins and cellulose resins. From the standpoint of the durability of the coating layer, the use of a two-component curable polyurethane resin is preferred.

In the case of a two-component curable urethane resin, it is preferable to use as the main component any of various types of polyols, such as saturated polyester polyols, acrylic polyols and polycarbonate polyols, and to use as the isocyanate a non-yellowing polyisocyanate, examples of which include adducts, biurets, isocyanurates and mixtures thereof, of hexamethylene diisocyanate, isophorone diisocyanate, hydrogenated xylylene diisocyanate or the like.

The coating composition includes an effect pigment. In the present invention, the effect pigment may be one which has polarizing properties. In cases where there are a plurality of coating layers, it is not necessary for effect pigments to be included in the coating compositions for all of the plurality of layers, so long as an effect pigment is included in the coating composition for at least one layer.

Effect pigments are broadly divided into metal oxide-coated micas, basic lead carbonate, bismuth oxychloride and natural pearl essence. Selecting metal oxide-coated micas is preferred because these are the best from the standpoint of nontoxicity and chemical stability. In general, titanium dioxide and iron oxide are frequently used as the metal oxide; various colors and interference effects can be obtained by varying the coating ratio (coating layer thickness) thereof. The larger the particle size of these pigments, the greater the special effect (brilliance) that can be obtained. However, because effect pigments tend to precipitate more easily the larger the particle size of the pigment, it is desirable to select a pigment having a suitable particle size.

It is desirable for the effect pigment used in this invention to be a material composed of composite particles having a core of mica and a coat that covers this core, such as the above-mentioned metal oxide-coated mica. The polarizing materials mentioned in above-cited JP-A 2009-45347 may be used as the effect pigment in this invention. More specifically, commercially available products such as the Iriodin® 7000 Series and the Iriodin® 200 Series from Merck KGaA may be used. In this invention, by using a material having polarizing properties as the effect pigment, the visual sensation of the ball changes with the viewing angle, enabling the elegant appearance of the markings in particular to be enhanced.

The content of the effect pigment included in the coating layer, although not particularly limited, is preferably 3 parts by weight or more, more preferably 4 parts by weight or more, and even more preferably 5 parts by weight or more, per 100 parts by weight of the base resin of the coating. The upper limit is preferably 23 parts by weight or less, more preferably 20 parts by weight or less, and even more preferably 17 parts by weight or less. When this content is too small, it may be difficult to achieve a quality feel for the ball as a whole. On the other hand, when this content is too large, the L value of the markings after coating application may decrease and the markings may appear blurry.

The coating composition may optionally include suitable amounts of various additives, such as antioxidants, ultraviolet absorbers, light stabilizers, fluorescent agents and fluorescent whiteners.

The method of applying the above coating onto the surface of the cover is not particularly limited. Known methods such as electrostatic painting, spray painting and brush painting may be used for this purpose.

The thickness of the coating layer applied to the cover is not particularly limited, and is generally from 3 to 100 µm, and preferably from 10 to 20 µm.

Markings are provided inside of the coating layer. That is, markings are printed onto the outer surface of the cover and those markings are covered by the coating layer. By thus forming the coating layer over the markings, even after repeated use of the golf ball, the markings are protected.

The method of printing the markings on the cover surface is not particularly limited. For example, a printing technique such as pad printing, stamping, inkjet printing or transfer film printing may be used.

It is critical for the markings to have a measured L value (lightness) prior to application of the coating layer which is 60 or less. The L value is preferably 50 or less, and more preferably 40 or less. If the L value is too high, when the coating layer containing an effect pigment having polarizing properties is formed on the surface of the cover and markings, in the ball appearance, the markings end up becoming blurred, the ball discernibility decreases and the quality feel of the ball is ultimately lost.

The L value (lightness) of the overall ball is preferably 83 or more, more preferably 86 or more, and even more preferably 89 or more. When this value is too small, the ball may appear darker and the discernibility and quality feel of the ball may decrease.

The overall ball has an a value in the Lab color space which is preferably equal to or more than −2.0, more preferably equal to or more than −1.5, and more preferably equal to or more than −1.0. The upper limit is preferably +2.0 or less, more preferably +1.5 or less, and more preferably +1.0 or less. A larger a value in the positive direction results in a strongly reddish color; a smaller a value results in a strongly greenish color. Hence, outside of the above range in values, the white-based appearance of the inventive ball may be lost.

The overall ball has a b value in the Lab color space which is preferably equal to or more than −5.0, more preferably equal to or more than −4.0, and more preferably equal to or more than −3.0. The upper limit is preferably +5.0 or less, more preferably +4.0 or less, and more preferably +3.0 or less. A larger b value in the positive direction results in a strongly yellowish color; a smaller a value results in a strongly bluish color. Hence, outside of the above range in values, the white-based appearance of the inventive ball may be lost.

As noted above, the C value (chroma) can be expressed as $C=(a^2+b^2)^{1/2}$ The C value (chroma) of the overall ball is preferably 5.0 or less, more preferably 4.0 or less, and even more preferably 3.0 or less. When this C value is large, the hue of the overall ball becomes perceptible to the human eye and the ball is recognized as not being a white ball. Moreover, the ball may feel strange to users accustomed to using white balls.

The L value (lightness) and C value (chroma) of the overall ball refer to the lightness and chroma of places on the ball surface other than the markings.

The color difference ΔE between the golf ball to which the coating layer has been applied and the sphere obtained by encasing the core with the intermediate layer (intermediate layer-encased sphere) is preferably 1.0 or more, more preferably 3.0 or more, and even more preferably 5.0 or more. The upper limit is preferably 10.0 or less, more preferably 8.5 or less, and even more preferably 7.0 or less. When this value is too small, the difference with a merely white ball may become difficult to perceive and may result in a poor discernibility and the lack of a quality feel. On the other hand, when this value is too large, the ball may not fit the category of a white ball to golfers who continue using white balls and may thus feel strange. The above color difference can be calculated from the following formula.

$$\Delta E=[(\Delta L)^2+(\Delta a)^2+(\Delta b)^2]^{1/2}$$

Ball specifications such as the weight and diameter of the inventive golf ball may be suitably set in accordance with the Rules of Golf.

EXAMPLES

The following Examples and Comparative Examples are provided to illustrate the invention, and are not intended to limit the scope thereof.

Examples 1 to 7, Comparative Examples 1 to 7

Cores common to all the Examples and Comparative Examples and having a diameter of 37.3 mm and a weight of 32.85 g were produced by preparing a core composition formulated as shown in Table 1 below and then carrying out vulcanization at 153° C. for 13 minutes.

TABLE 1

| Rubber formulation (pbw) | Common to Examples and Comparative Examples |
|---|---|
| Polybutadiene | 100 |
| Zinc oxide | 27.2 |
| Zinc stearate | 3 |
| Antioxidant | 0.3 |
| Zinc salt of pentachlorothiophenol | 0.6 |

TABLE 1-continued

| Rubber formulation (pbw) | Common to Examples and Comparative Examples |
|---|---|
| Zinc acrylate | 24.5 |
| Organic peroxide (1) | 0.6 |
| Organic peroxide (2) | 1.2 |

Details on the above formulation are given below.

Polybutadiene: Available under the trade name "BR 01" from JSR Corporation

Zinc oxide: Available as "Grade 3 Zinc Oxide" from Sakai Chemical Co., Ltd.

Zinc stearate: Available as "Zinc Stearate G" from NOF Corporation

Antioxidant: Available under the trade name "Nocrac NS-6" from Ouchi Shinko Chemical Industry Co., Ltd.

Zinc Salt of Pentachlorothiophenol:

Available from Wako Pure Chemical Industries, Ltd.

Zinc acrylate: Available as "ZN-DA85S" from Nippon Shokubai Co., Ltd.

Organic Peroxide (1): Dicumyl peroxide, available under the trade name "Percumyl D" from NOF Corporation Organic Peroxide (2): A mixture of 1,1-di(t-butylperoxy) cyclohexane and silica, available under the trade name "Perhexa C-40" from NOF Corporation Formation of Intermediate Layer-Encased Sphere Next, an intermediate layer was formed by injection-molding resin material A shown in Table 2 over the surface of the above core using an injection mold, thereby producing a sphere composed of a core encased by an intermediate layer having a thickness of 1.45 mm and a Shore D hardness of 50. Alternatively, intermediate layer-forming resin material B shown in Table 2 is similarly injection-molded over the surface of the above core, producing a sphere composed of a core encased by an intermediate layer having a thickness of 1.45 mm and a Shore D hardness of 50 (intermediate layer-encased sphere).

TABLE 2

| Intermediate layer material (pbw) | A | B |
|---|---|---|
| AN4319 | 100 | 100 |
| Magnesium stearate | 70 | 70 |
| Magnesium oxide | 1.9 | 1.9 |
| Titanium oxide | 4.2 | 1.5 |
| Yellow pigment (1) | | 0.51 |

Formation of Cover

Next, cover (outermost layer)-forming resin material I shown in Table 3 was injection-molded over the intermediate layer-encased sphere using a different injection mold than above, thereby forming a cover having a thickness of 1.25 mm and a Shore D hardness of 59.

TABLE 3

| Cover material (pbw) | I |
|---|---|
| AM7318 | 60.0 |
| AM7327 | 40.0 |

Details on the formulations in Tables 2 and 3 are given below.

AM7318, AM7327: Ionomer resins from Dow-Mitsui Polychemicals Co., Ltd.

AN4319: Ethylene-(meth)acrylic acid copolymer resins available as "Nucrel" from Dow-Mitsui Polychemicals Co., Ltd.

Magnesium oxide: Available under the product name "Kyowamag™ MF-150" from Kyowa Chemical Industry Co., Ltd.

Titanium oxide: Available under the product name "Pigment White 6"

Yellow pigment (1): Available under the product name "Pigment Yellow 53"

Formation of Markings

In Examples 1 to 6, markings of the same colors as color chips of various colors were printed onto the cover surface by a transfer film printing method.

In Example 7 and Comparative Examples 1 to 7, using color chips of various colors, the color tones of the color chips themselves are measured. The following six types of color chips are used.

Color Chips:
Black color chip (color No: DIC 582)
Navy blue color chip (color No: PANTONE 281U)
Orange color chip (color No: PANTONE 165C)
Yellow color chip (color No: DIC 87)
Green color chip (color No: DIC 249)
Red color chip (color No: PANTONE 192U)

Formation of Coating Layer

Next, a two-component curable polyurethane resin formulated as shown in Table 4 is used as the coating composition common to all of the Examples and Comparative Examples.

TABLE 4

| Coating composition (pbw) | Main component | Polyol (A) | 41.3 |
|---|---|---|---|
| | | Solvent (A) | 98.5 |
| | Curing agent | Isocyanate (B) | 58.7 |
| | | Solvent (B) | 81.1 |
| | Effect pigment | | *M1 to M6 |

*The types and contents of effect pigment are shown in Table 5

A polyester polyol synthesized by the following method was used as Polyol (A) in the main component of the coating composition.

A reactor equipped with a reflux condenser, a dropping funnel, a gas inlet and a thermometer was charged with 140 parts by weight of trimethylolpropane, 95 parts by weight of ethylene glycol, 157 parts by weight of adipic acid and 58 parts by weight of 1,4-cyclohexanedimethanol, following which the reaction was effected by raising the temperature to between 200 and 240° C. under stirring and heating for 5 hours. This yields a polyester polyol having an acid value of 4, a hydroxyl value of 170 and a weight-average molecular weight (Mw) of 28,000.

An isocyanurate of hexamethylene diisocyanate (HMDI) available under the trade name Duranate™ TPA-100 (NCO content, 23.1%; nonvolatiles, 100%) is used as Isocyanate (B) in the curing agent.

Butyl acetate is used as Solvent (A) in the main component, and ethyl acetate and butyl acetate are used as Solvent (B) in the curing agent.

The types and contents of the effect pigment used in Examples 1 to 6 are shown in Table 5. The effect pigment content is indicated as the amount per 100 parts by weight of the base resin. The amount of base resin shown in the table represents the combined amount of the main component (solids) and the curing agent (solids). In each of these Examples, the coating composition was applied with an air spray gun onto the surface of the cover (outermost layer), thereby producing a golf ball having a 15 μm thick coating layer formed thereon. In Example 7 and Comparative Examples 1 to 7, a golf ball having a coating layer formed thereon is produced in the same way as just described.

TABLE 5

| Coating layer (pbw) | M1 | M2 | M3 | M4 | M5 | M6 |
|---|---|---|---|---|---|---|
| Base resin | 100 | 100 | 100 | 100 | 100 | 100 |
| Iriodin 7205 (gold) | 17 | | | | 6 | |
| Iriodin 7235 (green) | | | 17 | | | |
| Iriodin 7215 (red) | | | | 6 | | |
| Iriodin 100 (silver) | | | | | | 17 |

The Iriodin Series mentioned above are mica-based pearlescent pigments available from Merck KGaA. These are chemically stable inorganic pearlescent pigments in powder form that are made of natural mica coated on the surface with a high-refractive-index metal oxide such as titanium oxide or iron oxide. The multiple reflections that arise due to the refractive index difference between the metal oxide layer and the mica produce a luster like that of a pearl.

Of the Iriodin Series, the 7000 Series is an interference color series which corresponds to polarizing pigments, and the 100 Series is a silver-colored series which do not correspond to polarizing pigments.

Details on the make-up of the respective layers in each of the resulting golf balls are shown in Tables 6 and 7. The deflections and color tones of the respective balls are evaluated by the following methods.

Compressive Deformation (Deflection) of Core, Intermediate Layer-Encased Sphere and Ball The core, intermediate layer-encased sphere or ball are held isothermally for at least 3 hours in a thermostatic chamber adjusted to 23.9±1° C., following which measurement is carried out in a 23.9±2° C. room. The sphere being tested is compressed at a rate of 10 mm/s and the deflection (mm) of the sphere under a final load of 1,275 N (130 kgf) from an initial load state of 98 N (10 kgf) was measured. The average value for ten measured spheres is determined.

Color Tone of Sphere (Intermediate Layer-Encased Sphere and Ball) and Markings

The color tones of the respective spheres (intermediate layer-encased sphere and ball) were measured using a color difference meter (model MSC-IS, from Suga Test Instruments Co., Ltd.), and the lightness (L value) and chroma (C value) were determined based on the Lab color system in JIS Z 8722.

The color tone of the markings is determined by measuring the color of the markings after they have been printed onto the surface of the cover. This is done by using a color chip of the same color as the markings and measuring the color of the chip.

When measuring the color tone of the overall ball (aside from the markings), a measurement aperture having a 30 mm diameter is used; when measuring the color tone of the markings, a measurement aperture having a 5 mm diameter is used.

TABLE 6

| | | | Example | | Comparative Example | | | Example | | | Comparative Example | |
|---|---|---|---|---|---|---|---|---|---|---|---|---|
| | | | 1 | 2 | 1 | 2 | 3 | 3 | 4 | 5 | 4 | 5 |
| | Ball construction (piece) | | 3P | 3P | 3P | 3P | 3P | 3P | 3P | 3P | 3P | 3P |
| Core | Diameter | mm | 37.3 | 37.3 | 37.3 | 37.3 | 37.3 | 37.3 | 37.3 | 37.3 | 37.3 | 37.3 |
| | Weight | g | 32.85 | 32.85 | 32.85 | 32.85 | 32.85 | 32.85 | 32.85 | 32.85 | 32.85 | 32.85 |
| | Deflection | mm | 3.6 | 3.6 | 3.6 | 3.6 | 3.6 | 3.6 | 3.6 | 3.6 | 3.6 | 3.6 |
| Intermediate layer | Color | | white | white | white | white | white | white | white | white | white | white |
| | Formulation | | A | A | A | A | A | A | A | A | A | A |
| | Thickness | mm | 1.45 | 1.45 | 1.45 | 1.45 | 1.45 | 1.45 | 1.45 | 1.45 | 1.45 | 1.45 |
| | Sheet hardness | Shore C hardness | 76 | 76 | 76 | 76 | 76 | 76 | 76 | 76 | 76 | 76 |
| | | Shore D hardness | 50 | 50 | 50 | 50 | 50 | 50 | 50 | 50 | 50 | 50 |
| Intermediate layer-encased sphere | Color tone | lightness L1 | 96.0 | 96.0 | 96.0 | 96.0 | 96.0 | 96.0 | 96.0 | 96.0 | 96.0 | 96.0 |
| | | chromaticity a1 | -0.9 | -0.9 | -0.9 | -0.9 | -0.9 | -0.9 | -0.9 | -0.9 | -0.9 | -0.9 |
| | | chromaticity b1 | 3.2 | 3.2 | 3.2 | 3.2 | 3.2 | 3.2 | 3.2 | 3.2 | 3.2 | 3.2 |
| | | chroma C1 | 3.3 | 3.3 | 3.3 | 3.3 | 3.3 | 3.3 | 3.3 | 3.3 | 3.3 | 3.3 |
| | Diameter | mm | 40.2 | 40.2 | 40.2 | 40.2 | 40.2 | 40.2 | 40.2 | 40.2 | 40.2 | 40.2 |
| | Weight | g | 39.55 | 39.55 | 39.55 | 39.55 | 39.55 | 39.55 | 39.55 | 39.55 | 39.55 | 39.55 |
| | Deflection | mm | 3.4 | 3.4 | 3.4 | 3.4 | 3.4 | 3.4 | 3.4 | 3.4 | 3.4 | 3.4 |
| Cover | Color | | transparent | transparent | transparent | transparent | transparent | transparent | transparent | transparent | transparent | transparent |
| | Formulation | | I | I | I | I | I | I | I | I | I | I |
| | Thickness | mm | 1.25 | 1.25 | 1.25 | 1.25 | 1.25 | 1.25 | 1.25 | 1.25 | 1.25 | 1.25 |
| | Sheet hardness | Shore C hardness | 88 | 88 | 88 | 88 | 88 | 88 | 88 | 88 | 88 | 88 |
| | | Shore D hardness | 59 | 59 | 59 | 59 | 59 | 59 | 59 | 59 | 59 | 59 |
| Markings | Color tone | color[1] | black | navy blue | orange | yellow | black | black | navy blue | green | orange | yellow |
| | | lightness L | 35.6 | 43.5 | 62.4 | 85.8 | 35.6 | 35.6 | 43.5 | 49.6 | 62.4 | 85.8 |
| | | chromaticity a | -2.5 | 2.6 | 37.8 | -10.4 | -2.5 | -2.5 | 2.6 | -18.3 | 37.8 | -10.4 |
| | | chromaticity b | 4.4 | -10.5 | 29.4 | 46.1 | 4.4 | 4.4 | -10.5 | 16.8 | 29.4 | 46.1 |
| | | chroma C | 5.0 | 10.8 | 47.8 | 47.2 | 5.0 | 5.0 | 10.8 | 24.8 | 47.8 | 47.2 |
| Coating layer | Color of effect pigment | | gold | gold | gold | gold | transparent | green | green | green | green | green |
| | Formulation | | M1 | M1 | M1 | M1 | M2 | M3 | M3 | M3 | M3 | M3 |
| Main body of ball | Color tone | lightness L2 | 89.9 | 89.9 | 89.9 | 89.9 | 89.9 | 90.1 | 90.1 | 90.1 | 90.1 | 90.1 |
| | | chromaticity a2 | -0.1 | -0.1 | -0.1 | -0.1 | 0.1 | -0.6 | -0.6 | -0.6 | -0.6 | -0.6 |
| | | chromaticity b2 | 1.9 | 1.9 | 1.9 | 1.9 | 0.6 | 2.6 | 2.6 | 2.6 | 2.6 | 2.6 |
| | | chroma C2 | 1.9 | 1.9 | 1.9 | 1.9 | 0.6 | 2.7 | 2.7 | 2.7 | 2.7 | 2.7 |
| | Color difference[2] | ΔE | 6.3 | 6.3 | 6.3 | 6.3 | 6.6 | 5.9 | 5.9 | 5.9 | 5.9 | 5.9 |
| Ball | Diameter | mm | 42.7 | 42.7 | 42.7 | 42.7 | 42.7 | 42.7 | 42.7 | 42.7 | 42.7 | 42.7 |
| | Weight | g | 45.4 | 45.4 | 45.4 | 45.4 | 45.4 | 45.4 | 45.4 | 45.4 | 45.4 | 45.4 |
| | Deflection | mm | 3.0 | 3.0 | 3.0 | 3.0 | 3.0 | 3.0 | 3.0 | 3.0 | 3.0 | 3.0 |

[1] Color tone of color chips having same color as markings printed onto transfer film was measured
[2] Color difference between main body of ball and intermediate layer-encased sphere

TABLE 7

| | | | Example | | Comparative Example | |
|---|---|---|---|---|---|---|
| | | | 6 | 7 | 6 | 7 |
| | Ball construction (piece) | | 3P | 3P | 3P | 3P |
| Core | Diameter | mm | 37.3 | 37.3 | 37.3 | 37.3 |
| | Weight | g | 32.85 | 32.85 | 32.85 | 32.85 |
| | Deflection | mm | 3.6 | 3.6 | 3.6 | 3.6 |
| Intermediate layer | Color | | white | white | yellow | white |
| | Formulation | | A | A | B | A |
| | Thickness | mm | 1.45 | 1.45 | 1.45 | 1.45 |
| | Sheet hardness | Shore C hardness | 76 | 76 | 76 | 76 |
| | | Shore D hardness | 50 | 50 | 50 | 50 |
| Intermediate layer-encased sphere | Color tone | lightness L1 | 96.0 | 96.0 | 91.4 | 96.0 |
| | | chromaticity a1 | -0.9 | -0.9 | -6.8 | -0.9 |
| | | chromaticity b1 | 3.2 | 3.2 | 20.1 | 3.2 |
| | | chroma C1 | 3.3 | 3.3 | 21.2 | 3.3 |
| | Diameter | mm | 40.2 | 40.2 | 40.2 | 40.2 |
| | Weight | g | 39.55 | 39.55 | 39.55 | 39.55 |
| | Deflection | mm | 3.4 | 3.4 | 3.4 | 3.4 |
| Cover | Color | | transparent | transparent | transparent | transparent |
| | Formulation | | I | I | I | I |
| | Thickness | mm | 1.25 | 1.25 | 1.25 | 1.25 |
| | Sheet hardness | Shore C hardness | 88 | 88 | 88 | 88 |
| | | Shore D hardness | 59 | 59 | 59 | 59 |

TABLE 7-continued

|  |  |  | Example | | Comparative Example | |
|---|---|---|---|---|---|---|
|  |  |  | 6 | 7 | 6 | 7 |
| Markings | Color tone | color[1] | black | red | black | black |
|  |  | lightness L | 35.6 | 58.2 | 35.6 | 35.6 |
|  |  | chromaticity a | −2.5 | 40.9 | −2.5 | −2.5 |
|  |  | chromaticity b | 4.4 | 11.0 | 4.4 | 4.4 |
|  |  | chroma C | 5.0 | 42.4 | 5.0 | 5.0 |
| Coating layer | Color of effect pigment | | red | red | transparent | gray |
|  | Formulation | | M4 | M4 | M2 | M6 |
| Main body of ball | Color tone | lightness L2 | 89.8 | 89.8 | 86.4 | 90.4 |
|  |  | chromaticity a2 | 0.4 | 0.4 | −5.6 | 0.4 |
|  |  | chromaticity b2 | 0.4 | 0.4 | 16.5 | −0.2 |
|  |  | chroma C2 | 0.5 | 0.5 | 17.5 | 0.4 |
| Color difference[2] | ΔE | | 6.9 | 6.9 | 6.3 | 6.6 |
| Ball | Diameter | mm | 42.7 | 42.7 | 42.7 | 42.7 |
|  | Weight | g | 45.4 | 45.4 | 45.4 | 45.4 |
|  | Deflection | mm | 3.0 | 3.0 | 3.0 | 3.0 |

The ball appearance for each of the resulting golf balls was evaluated as follows. Ten skilled amateur golfers with handicaps of 10 or less who use white balls were asked to evaluate the quality feel of the ball, based on which the ball was rated according to the criteria shown below. The results are presented in Table 8.

Quality Feel of Overall Ball

Exc: Eight or more golfers thought the appearance of the overall ball had a quality feel Good: From five to seven golfers thought the appearance of the overall ball had a quality feel Fair: Three or four golfers thought the appearance of the overall ball had a quality feel NG: Two or fewer golfers thought the appearance of the overall ball had a quality feel Quality Feel of Markings Exc: Eight or more golfers thought the coloring of the markings had a quality feel Good: From five to seven golfers thought the coloring of the markings had a quality feel Fair: Three or four golfers thought the coloring of the markings had a quality feel NG: Two or fewer golfers thought the coloring of the markings had a quality feel Acceptability of Overall Ball Appearance Exc: Eight or more golfers did not feel ball appearance was strange Good: From five to seven golfers did not feel ball appearance was strange Fair: Three or four golfers did not feel ball appearance was strange NG: Two or fewer golfers did not feel ball appearance was strange Total Score In each of the above evaluations, 3 points was assigned for "Exc," 2 points for "Good," 1 point for "Fair" and 0 points for "NG." The scores of these three evaluations were added up to give a total score.

Figure 2:
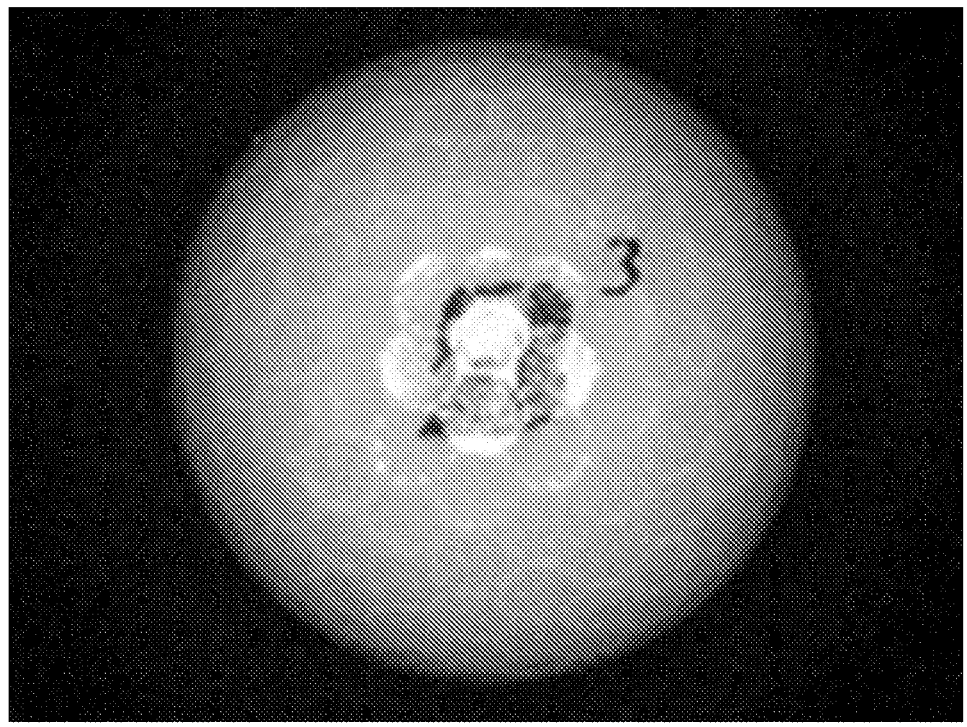
FIG. 2 is a photograph showing the appearance of the golf ball in Example 1 according to the invention.
Figure 3:
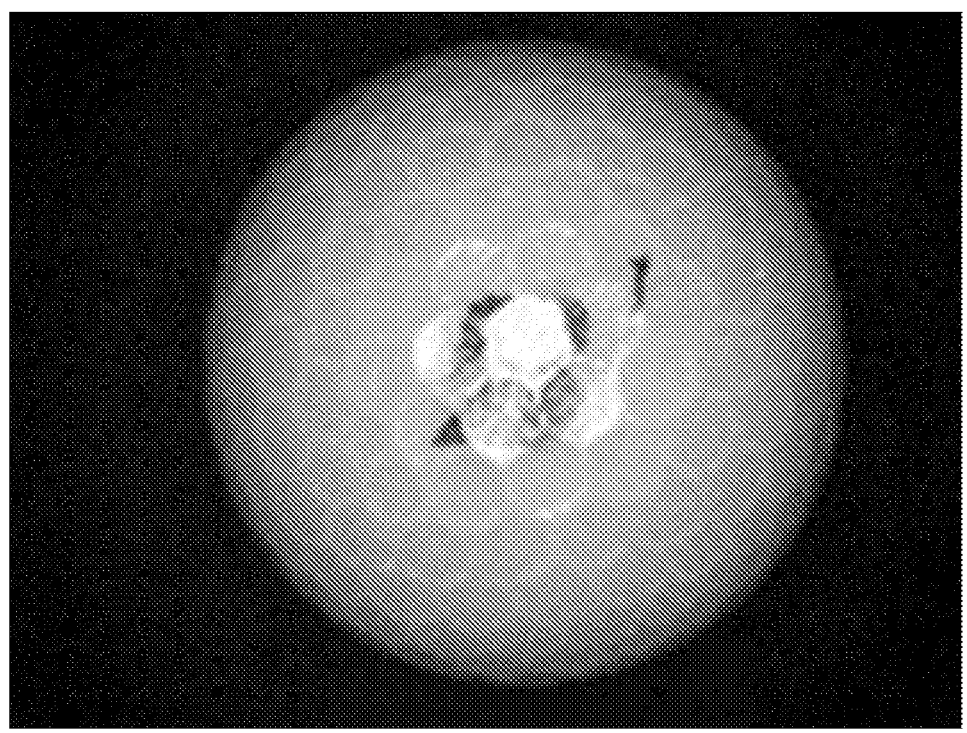
FIG. 3 is a photograph showing the appearance of the golf ball in Example 2 according to the invention.

Of the above Examples and Comparative Examples, FIG. 2 shows a photograph of the appearance of the golf ball in Example 1, and FIG. 3 shows a photograph of the appearance of the golf ball in Example 2.

TABLE 8

|  | Example | | Comparative Example | | | Example | | | Comp. Example | | Example | | Comp. Example | |
|---|---|---|---|---|---|---|---|---|---|---|---|---|---|---|
|  | 1 | 2 | 1 | 2 | 3 | 3 | 4 | 5 | 4 | 5 | 6 | 7 | 6 | 7 |
| Quality feel of overall ball | Exc | Exc | Exc | Exc | fair | Exc | Exc | Exc | Exc | Exc | good | good | NG | good |
| Quality feel of markings | Exc | good | NG | NG | fair | Exc | Exc | good | NG | NG | Exc | Exc | fair | good |
| Acceptability of overall ball appearance | good | good | good | good | Exc | good | good | good | good | good | Exc | Exc | fair | good |
| Total score | 8 | 7 | 5 | 5 | 5 | 8 | 8 | 7 | 5 | 5 | 8 | 8 | 2 | 6 |

As shown in Table 8, the golf balls in Examples 1 to 7 have high total scores. The evaluations obtained for these Examples indicate that, in white balls, the overall ball is recognized as having a quality feel, the markings also are recognized as having a quality feel, and the appearance of the overall ball feels substantially normal.

By contrast, in Comparative Examples 1 to 7, the evaluation results were as follows.

In Comparative Example 1, the L value of the markings prior to application of the coating layer is larger than 60, and so the quality feel of the markings is inferior.

In Comparative Example 2, the L value of the markings prior to application of the coating layer is larger than 60, and so the quality feel of the markings is inferior.

In Comparative Example 3, the coating layer does not include an effect pigment, and so the quality feel of the main body of the ball and of the markings is inferior.

In Comparative Example 4, the L value of the markings prior to application of the coating layer is larger than 60, and so the quality feel of the markings is inferior.

In Comparative Example 5, the L value of the markings prior to application of the coating layer is larger than 60, and so the quality feel of the markings is inferior.

In the golf ball of Comparative Example 6, the coating layer contains no effect pigment (polarizing pigment) and the intermediate layer-encased sphere has a yellow shade. As a result, evaluations of the quality feel of the main body of the ball, the quality feel of the markings and the acceptability of the overall ball appearance are lower than in the above Examples according to the invention.

In the golf ball of Comparative Example 7, the effect pigment contained in the coating layer does not have polarizing properties and the color is silver and thus lacking in hue. As a result, evaluations of the quality feel of the main body of the ball, the quality feel of the markings and the acceptability of the overall ball appearance are lower than in the above Examples according to the invention.

Japanese Patent Application No. 2022-025662 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core, a cover, at least one intermediate layer formed between the core and the cover, and a coating layer formed on an outer surface of the cover, wherein the cover is formed of a transparent or translucent resin composition; the intermediate layer is formed of a resin composition, the sphere obtained by encasing the core with the intermediate layer (intermediate layer-encased sphere) has an L value (lightness) of 92 or more and a chroma value C of 10 or less in the Lab color space based on JIS Z 8722; the coating layer comprises a single layer or a plurality of layers, at least one of which contains an effect pigment having polarizing properties; markings are provided inside of the coating layer, the markings having an L value as measured prior to application of the coating layer of 60 or less; and the ball with the coating layer thereon and the intermediate layer-encased sphere have a color difference $\Delta E$ therebetween which is 10 or less.

2. The golf ball of claim 1, wherein the intermediate layer includes a white pigment.

3. The golf ball of claim 2, wherein the white pigment is titanium oxide.

4. The golf ball of claim 2, wherein the L value (lightness) of the intermediate layer-encased sphere is 94 or more and the chroma is 5 or less.

5. The golf ball of claim 1, wherein the effect pigment is a material comprised of composite particles which have a core of mica and a coat that covers the core.

6. The golf ball of claim 1, wherein the effect pigment is included in an amount of from 3 to 23 parts by weight per 100 parts by weight of a base resin in the coat.

* * * * *